Patented Apr. 17, 1923.                                           1,451,674

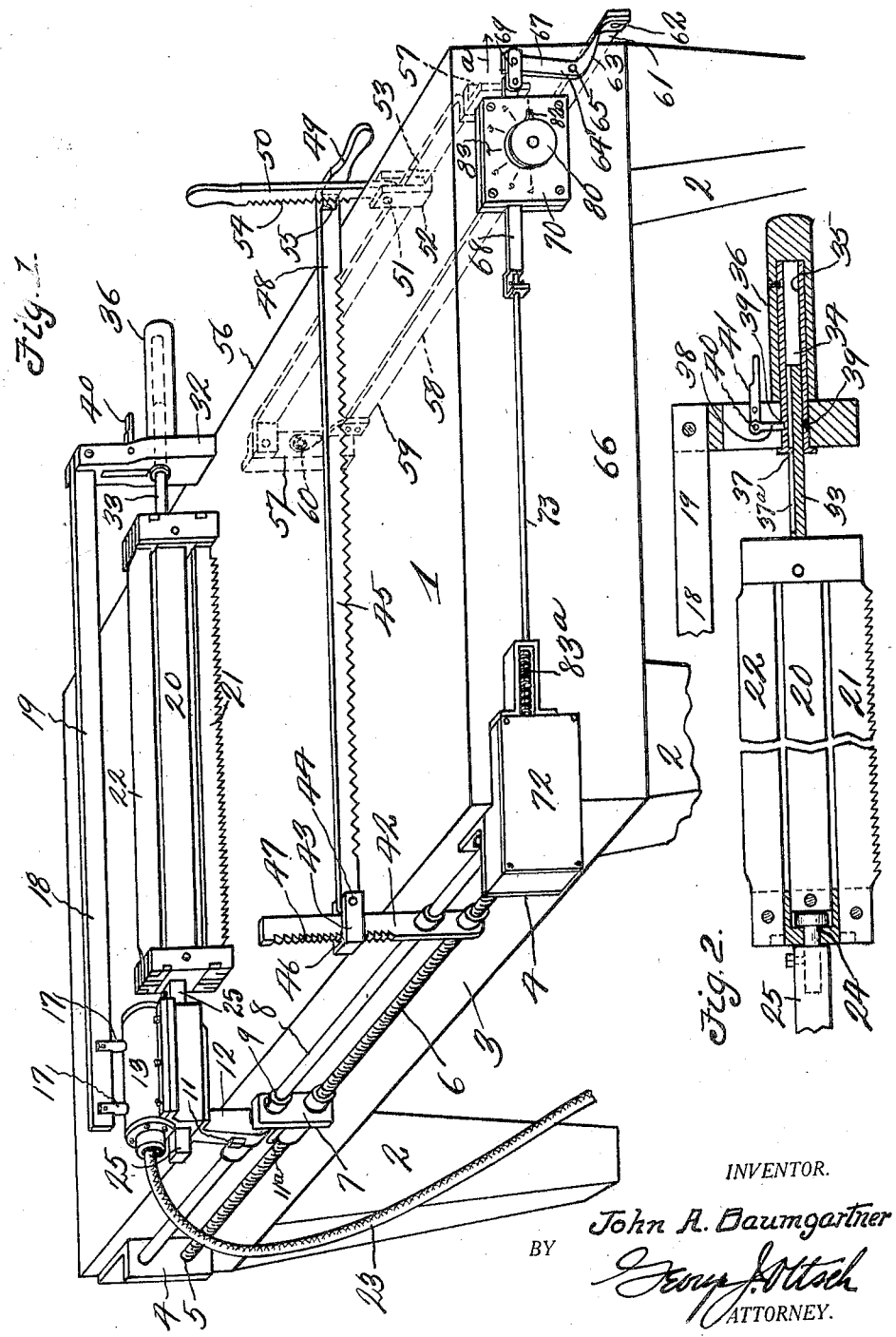

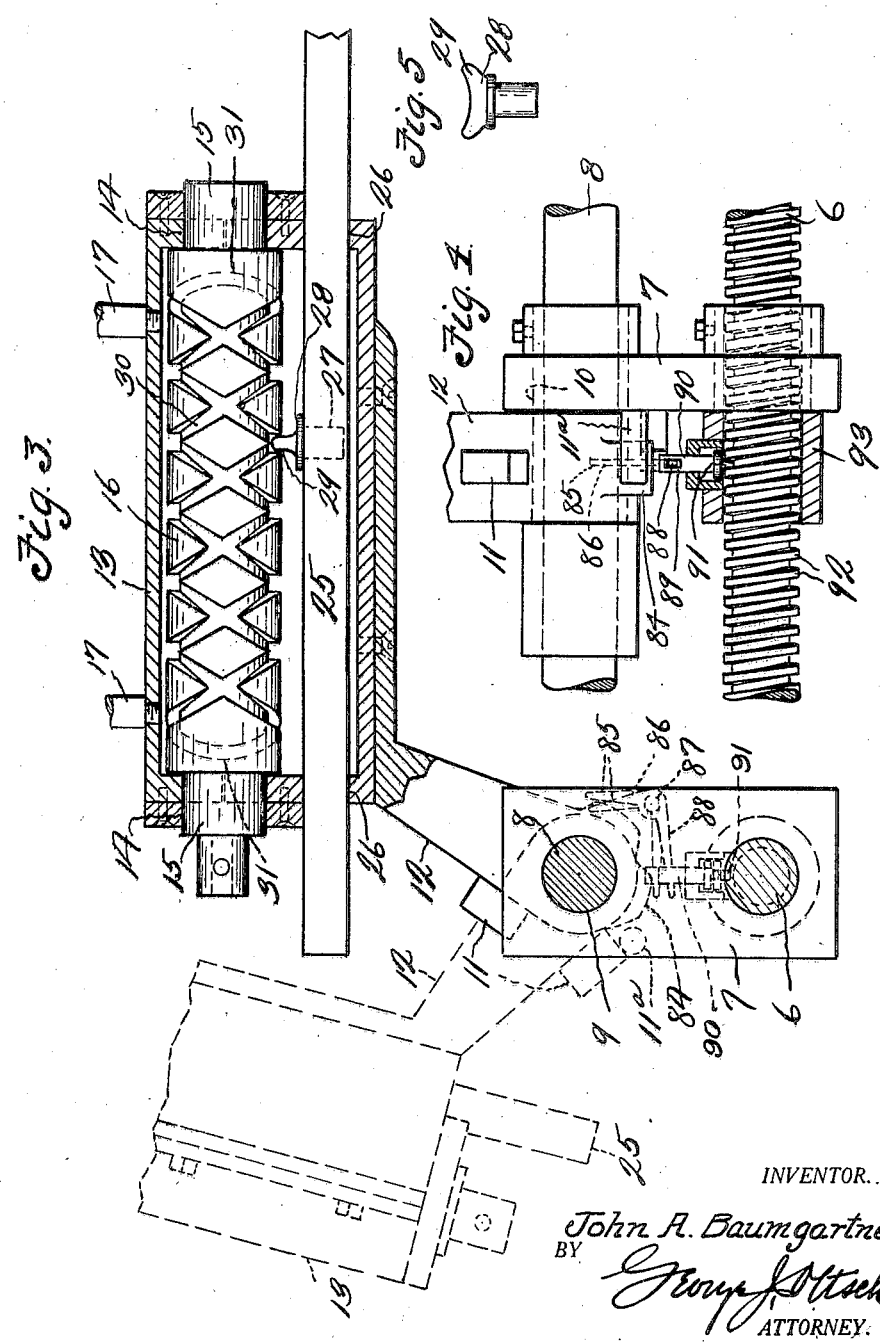

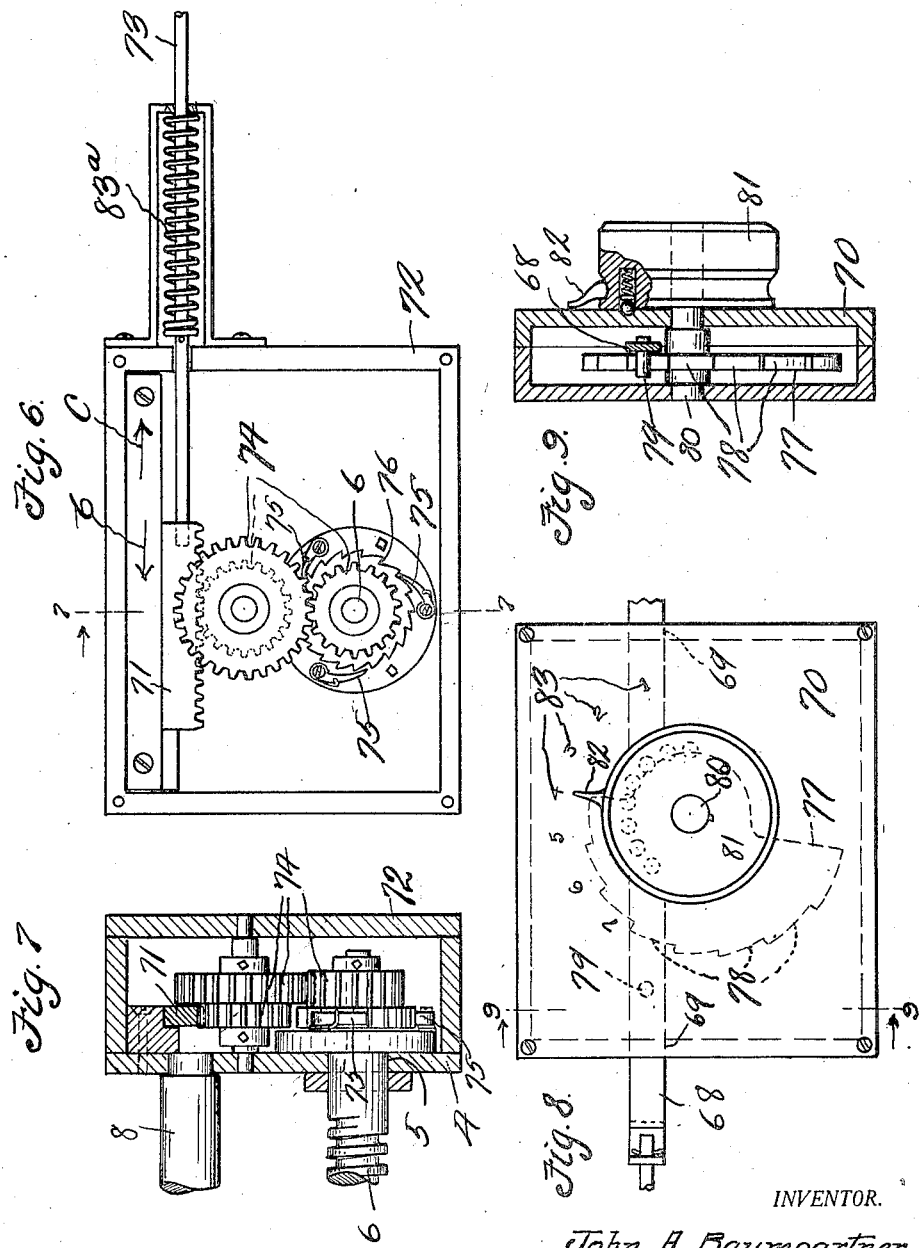

UNITED STATES PATENT OFFICE.

JOHN A. BAUMGARTNER, OF SOUTH BEND, INDIANA.

MEAT-CUTTING MACHINE.

Application filed December 16, 1921.   Serial No. 522,896.

*To all whom it may concern:*

Be it known that I, JOHN A. BAUMGARTNER, a citizen of the United States, residing at South Bend, in the county of St. Joseph and State of Indiana, have invented certain new and useful Improvements in Meat-Cutting Machines, of which the following is a specification.

The invention relates to meat severing machines and has for its object to provide a meat severing machine comprising a transversely movable carriage having a longitudinally movable severing element therein, said carriage being fed transversely by means of a feed screw transversely disposed and intermittently rotated a predetermined number of revolutions according to the thickness of the slice of meat desired. Also to provide a transversely movable meat holding lever independently movable in relation to the severing carriage and comprising a pivotal bar, said pivotal bar having its free end positioned adjacent holding means whereby the pivoted holding bar may be held in engagement with the meat being severed. A further object is to provide actuating means for rotating the feed screw comprising a reciprocating rack having a gear connection with a gear carried by the feed screw, said rack when reciprocated causing the feed screw to rotate in one direction, and the feed screw is held against rotation in the other direction by pawls cooperating with a ratchet wheel.

A further object is to provide adjacent the rod carrying the reciprocating rack, means for accurately gaging the amount of movement of said rod, said means comprising a cam having notches therein, any notch of which cam may be placed where it will be engaged by a pin carried by the rack rod and limit the movement of the rack rod and rack in one direction during the carriage feeding operation. The notches of the cam being so positioned on the cam that the cam may be adjusted for moving the carriage a predetermined distance according to the thickness of slice of meat desired.

With the above and other objects in view the invention resides in the combination and arrangement of parts as hereinafter set forth, shown in the drawings, described and claimed, it being understood that changes in the precise embodiment of the invention may be made within the the scope of what is claimed without departing from the spirit of the invention.

In the drawings:—

Figure 1 is a perspective view of the meat cutting machine.

Figure 2 is a longitudinal sectional view through a portion of the saw carrying frame, and one end of the carriage.

Figure 3 is an enlarged longitudinal sectional view through the rear end of the carriage, the feed screw and guide shaft, showing the rotatable element having an endless groove therein for reciprocating the severing element.

Figure 4 is an enlarged detail rear elevation, partly in section of the connection between the carriage and the feed screw.

Figure 5 is a front elevation of the pivoted member carried by the severing element and which engages the groove of the rotor.

Figure 6 is a view showing the gear and ratchet connection between the reciprocating rack and the feed screw.

Figure 7 is a vertical sectional view taken on line 7—7 of Figure 6.

Figure 8 is a front elevation of the casing and adjustable cam carried therein, by means of which cam the movement of the feed screw is gaged.

Figure 9 is a vertical transverse sectional view through the cam casing taken on line 9—9 of Figure 8.

Referring to the drawings, the numeral 1 designates a rectangular shaped meat block, and 2 supporting legs therefor. Extending outwardly from the rear side 3 of the block 1 are brackets 4, in bearings 5 of which the feed screw 6 is rotatably mounted, said feed screw being preferably horizontally disposed as shown and adapted to be intermittently rotated predetermined amounts or distances according to the thicknesses of the slices of meat desired through the medium of mechanism hereinafter set forth. The feed screw 6 has slidably mounted thereon a feed screw block 7, which block is longitudinally movable on the feed screw and is held in vertical position as shown in Figures 1 and 3 by means of a guide shaft 8 which is in parallel relation to the feed screw and passes through an aperture 9 in the block 7 and is supported by the brackets 4. The upper end of the block 7 has rotatably mounted therein a sleeve 10, on which is keyed by means of the key 11 a downwardly extending arm 12, which supports the casing 13 in bearings 14 of which are mounted the pintles 15 of a rotor 16. Extending upwardly from the casing 13 are spaced lugs 17 to which lugs is secured the rear end of the bar 18 forming part of a supporting frame 19, which supports a reciprocating saw and knife carrying frame 20. The saw and knife carrying frame 20 is provided with a saw blade 21 and a knife blade 22, either of which may be disposed in lower position during a severing operation, for instance the saw may be placed in lower position for severing a bone, and then after the bone has been severed the knife blade 22 may be positioned in lower position for use, for continuing the severing operation. During the severing operation the reciprocating frame 20 is reciprocated by means of a rotor 16, which is rotated through the medium of the flexible shaft 23 leading to any source of power such as an electric motor. The rear end of the reciprocating frame 20 is pivotally connected as at 24 to the rectangular shaped shaft 25, which shaft is slidably mounted in bearings 26 of the rotor casing 13 and is disposed preferably in parallel relation to the rotor 16. Pivotally mounted in a bearing 27 of the rectangular shaped shaft 25 is an upwardly extending lug 28, which lug has its upper relatively thin portion 29 disposed in the endless groove 30 of the rotor 16 and by pivotally mounting the lug 28 it will be seen that when said lug, during the rotation of the rotor 16, reaches the end convolutions 31 of the groove 30, that the direction of movement of the rectangular shaped shaft 25 will be reversed, thereby causing said shaft to be reciprocated in the bearings 26 and consequently causing the severing element frame 20 to be reciprocated and simulating a sawing or cutting operation.

The forward end of the bar 18 is provided with a downwardly extending arm 32, the lower end of which rests upon the meat cutting block 1, on which meat to be sliced is disposed. The reciprocating severing frame 20 is provided with a forwardly extending shaft 33, which is slidably mounted in the chamber 34 of a sleeve 35 carried by the handle member 36 and has a lug and slot connection 37 and 37ª with the sleeve 35, therefore it will be seen that the frame 20 will be held in vertical position during the reciprocation thereof, and to maintain said frame in vertical position no matter whether the knife blade 22 is in lower position or the saw blade 21, a dog 38 is provided. The lower end of the dog 38 is received in either one of the apertures 39 of the sleeve 35 and holds said sleeve against rotation and consequently through the medium of the lug and slot connections 37 and 37ª with the shaft 33 holds the severing frame 20 against rotative movement. The dog 38 is pivotally connected at 40 to a pivoted finger engaging member 41 located above the handle member 36 and adapted to be depressed when it is desired to reverse the positions of the severing members carried by the severing frame 20.

Slidably mounted on the feed screw 6 and the guide shaft 8 is a vertically disposed bracket 42, on which bracket is vertically adjustable a U-shaped member 43, to which U-shaped member is pivotally connected at 44 a meat holding lever 45, which lever is adapted to be forced downwardly into engagement with the meat for holding the meat during the severing or sawing operation. The U-shaped member 43 has a tooth connection 46 with the teeth 47 of the bracket 42. The free end 48 of the holding lever 45 is provided with a handle member 49 adapted to be grasped by the operator for holding the lever in engagement with the meat being severed. It has been found that at times it is desirable for the operator to have both hands free for controlling the severing mechanism, therefore a pivoted lever 50 is provided, which lever is pivoted at 51 to a transversely movable yoke 52 longitudinally movable on a bar 53. The lever 50 is provided with a plurality of teeth 54, with any one of which a tooth 55 carried by the lever 45 may cooperate in such a manner that the lever 45 will be held against upward movement.

The bar 53 is disposed on the forward side 56 of the block 1 and is preferably carried by brackets 57, which brackets also form supporting means for an operating bar 58 adapted to be moved by the leg or knee of the operator for causing a manual rotation of the feed screw according to the thickness of slice of meat desired. The end 59 of the bar 58 is loosely pivoted at 60 to the bracket 57 and its end 61 is secured at 62 to the arm 63 of a lever 64 which is pivoted at 65 to the side 66 of the block 1 and has its arm 67 extending upwardly, and is adapted to be moved in the direction of the arrow $a$ when the actuating bar 58 is forced inwardly in the direction of the side 56 of the block 1. When the arm 67 is moved in the direction of the arrow $a$, a pull is imparted in the same direction on the bar 68 through the medium of the link connection 69 therewith. The bar 68 is slidably mounted in bearings 69 of a casing 70 secured to the side 66 of the block and is connected to a rack bar 71 disposed in the casing 72 carried by the side 66 of the block 1 and the bracket 4, through the medium of a connecting rod 73. It will be seen that if the bar 68 is moved a predetermined distance that the rack bar 71 will move a corresponding distance, therefore the feed screw 6 which has a gear train connection 74 with the rack bar 71, will be moved or rotated a distance according to the predetermined movement of the rack bar 71, and to prevent retrograde movement of the feed screw 6 when the rack bar 71 moves in the direction of the arrow $b$, spring actuated pawls 75 are provided, which pawls cooperate with the ratchet wheel 76 and prevent the feed screw from rotating, however the ratchet wheel 76 is free to rotate during the movement of the rack bar 71 in the opposite direction. It will be seen that if means is provided for accurately gaging the movement of the rack bar 71 in the direction of the arrow $c$ Figure 6, that the movement of the carriage through the rotation of the feed screw 6 may be accurately gaged, and to accomplish this result a cam 77 is disposed within the casing 70, which cam is provided with a plurality of notches 78, anyone of which notches may be placed in the path of the lug 79 carried by the bar 68 for limiting the movement of the bar 68 in the direction of the arrow $a$, and as the notches are carried on the cam and are spirally arranged in relation to the center of the cam shaft 80, it will be seen that the movement of the bar 68, and consequent movement of the rack bar 71 may be accurately gaged according to which notch 78 is in the path of the lug 79. The cam shaft 80 is provided with a handle member 81 adapted to be grasped by the operator for rotating the pointer 82 into registration with any of the graduations 83, which graduations may indicate thicknesses of cuts anywhere from a sixteenth of an inch or multiples thereof, however this may be varied as desired. If during a meat severing operation it is desired to move the severing frame 20, the operator pushes inwardly on the bar 58 against the action of the spring 83$^a$ thereby rotating the feed screw 6 the desired distance according to adjustment of the cam 77. It will be noted that this is a manual operation of the feed screw and that when the bar 58 is released the spring 83$^a$ will return the rack 71 as shown in Figure 6.

When it is desired to move the severing carriage 20, and the carriage frame 19 longitudinally of the feed screw 6, independent of the feeding operation thereof, the operator grasps the handle 36 and tilts the frame as a whole upwardly to the dotted line position shown in Figure 3. When the frame is tilted the cam 84 engages the arm 85 of the bell crank lever 86, which lever is pivotally mounted as at 87 to the block 7, and has its substantially horizontally disposed arm 88 extending through an aperture 89 in a vertically movable pin 90. The lower end 91 of the pin 90 engages between the threads 92 of the feed shaft 6, and as the bell crank lever 86 is rocked on its pivotal point 87, the lower end 91 of the pin 90 will be moved out of engagement with the teeth 92 as shown in Figure 3 in dotted lines, thereby allowing the carriage supporting block 7 to be moved longitudinally on the feed screw 6 and the shaft 8. The pin 90 is carried by the sleeve 93 which extends through the lower end of the block 7, said sleeve being movable with the block 7.

From the above it will be seen that a meat cutting machine is provided which is simple in construction and one wherein the operation is simple and the movement of the carriage carrying the severing element may be accurately gaged and moved independently by the leg or knee of the operator in such a manner that he may utilize both hands for other purposes. It will also be seen that the weight of the rotor for reciprocating the severing frame has been reduced to a minimum and so constructed that its operation is positive.

When the carriage 19 is tilted upwardly and rearwardly to the dotted line position shown in Figure 3 the key 11 comes into engagement with the pin 11$^a$ carried by the block 7 and holds the carriage in tilted position, thereby allowing the carriage as a whole to be shifted to any desired position independently of the feed screw.

The invention having been set forth what is claimed as new and useful is:—

1. A meat cutting machine comprising a base, a transversely movable carriage disposed above said base, the rear end of said carriage being pivotally mounted, a meat severing element carried by said carriage, a feed screw cooperating with said carriage for intermittently moving the same, and means whereby said feed screw may be rotated a predetermined number of rotations.

2. A meat cutting machine comprising a base, a carriage disposed above said base and movable transversely, a severing element carried by said carriage, one end of said carriage being pivotally mounted on a guide shaft, a feed screw mounted in bearings and forming means for moving the carriage transversely, means whereby said feed screw may be intermittently rotated for moving the carriage, and selective means whereby the screw may be rotated for moving the carriage a predetermined distance.

3. The combination with a meat severing machine comprising a carriage transversely movable over a base, said carriage being pivotally mounted at one of its ends, of means for moving said carriage transversely, said means comprising a feed screw threaded to the carriage, a reciprocating rack having a gear connection with the feed screw, and means for reciprocating said rack a predetermined distance.

4. The combination with a movable carriage of a meat cutting machine, said carriage being pivotally mounted at one of its ends, of means for moving said carriage a predetermined distance, said means comprising a feed screw having a thread connection to the carriage, a reciprocating rack, gear connections between said reciprocating rack and screw, ratchet means whereby the screw will not be rotated upon movement of the rack in one direction, and adjustable means whereby the reciprocating rack may be selectively limited in its movement on its power stroke.

5. The combination with a meat severing machine comprising a transversely movable carriage, one end of said carriage being pivotally and slidably mounted on a guide rod, a feed screw having a thread connection with the carriage and disposed in parallel relation to the guide rod, a block slidably mounted on the feed screw, said carriage being pivotally connected to the block, and means whereby when the carriage is tilted upwardly on its pivotal point the threaded connection between the carriage and feed screw will be disengaged.

6. The combination with a carriage of a meat severing machine, said carriage being actuated by a feed screw, said carriage being pivotally mounted on a movable block and disposed above the feed screw, a vertically slidable finger disposed between the thread of the feed screw, a bell crank lever carried by the block, one arm of said bell crank lever having a connection with the finger, a lug carried by the carriage, and said lug being in position whereby upon a tilting action of the carriage it will engage the other arm of the bell crank lever and move the finger upwardly.

7. The combination with a meat severing machine comprising a movable carriage disposed above a meat supporting block and moved transversely intermittently by the rotation of a feed screw, said feed screw being intermittently rotated through the medium of a reciprocated rack having a gear connection therewith, of means whereby said reciprocating rack may be reciprocated a predetermined distance according to the thickness of the slice of meat desired.

8. The combination with a meat severing machine comprising a movable carriage disposed above a meat supporting block, said carriage being movable transversely by the rotation of a feed screw, said feed screw being intermittently rotated through the medium of a reciprocated rack having a gear connection therewith, means whereby said rack may be manually reciprocated, means whereby the rack may be allowed to move a predetermined distance, said means comprising a rotative disc, said disc having at its edge a plurality of surfaces at different distances from its center, and means whereby said disc may be rotated for placing any of its surfaces in alignment with a stop of the rack.

9. The combination with a reciprocating rack bar cooperating with a feed screw of a meat severing machine, of means whereby said rack bar may be allowed to move a predetermined distance, said means comprising a rotative member having a plurality of stops at different distances from the center thereof, and a stop carried by the rack bar and cooperating with any one of the plurality of stops.

10. The combination with a reciprocating rack bar cooperating with a feed screw of a meat severing machine, of means whereby said rack bar may be allowed to move a predetermined distance in one direction, said means comprising a stop carried by the rack bar, a rotative disc disposed adjacent the rack bar, said disc being provided with a plurality of stop surfaces at different distances from its center, and means whereby any of the stop surfaces may be placed in the path of the stop carried by the rack bar.

11. The combination with a reciprocating rack bar cooperating with a feed screw of a meat severing machine, of means whereby said rack bar may be allowed to move a predetermined distance in one direction, and manually operated lever means whereby said rack bar may be moved in one direction during the feed screw movement.

In testimony whereof I affix my signature.

JOHN A. BAUMGARTNER.